United States Patent
Rothman et al.

(10) Patent No.: US 7,334,120 B2
(45) Date of Patent: Feb. 19, 2008

(54) FIRMWARE EMULATION ENVIRONMENT FOR DEVELOPING, DEBUGGING, AND TESTING FIRMWARE COMPONENTS INCLUDING OPTION ROMS

(75) Inventors: Michael A. Rothman, Puyallup, WA (US); Vincent J. Zimmer, Federal Way, WA (US); Mark S. Doran, Olympia, WA (US); Andrew J. Fish, Olympia, WA (US); Michael D. Kinney, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 505 days.

(21) Appl. No.: 10/713,720

(22) Filed: Nov. 14, 2003

(65) Prior Publication Data
US 2005/0108514 A1    May 19, 2005

(51) Int. Cl.
*G06F 15/177* (2006.01)
(52) U.S. Cl. .............................. 713/2; 713/1; 717/129
(58) Field of Classification Search ...................... 713/2
See application file for complete search history.

(56) References Cited

U.S. PATENT DOCUMENTS

| | | | | | |
|---|---|---|---|---|---|
| 5,615,331 | A | * | 3/1997 | Toorians et al. | 714/9 |
| 5,913,058 | A | * | 6/1999 | Bonola | 713/2 |
| 2001/0018721 | A1 | * | 8/2001 | McKenna et al. | 710/126 |
| 2003/0212897 | A1 | * | 11/2003 | Dickerson et al. | 713/200 |
| 2004/0111707 | A1 | * | 6/2004 | Bliss et al. | 717/129 |
| 2004/0215950 | A1 | * | 10/2004 | Lindeman | 713/1 |
| 2005/0108511 | A1 | * | 5/2005 | Zimmer et al. | 713/1 |

* cited by examiner

*Primary Examiner*—Rehana Perveen
*Assistant Examiner*—Fahmida Rahman
(74) *Attorney, Agent, or Firm*—Blakely, Sokoloff, Taylor & Zafman LLP (57) ABSTRACT

A method and apparatus to execute a pre-boot application within an emulated pre-boot environment to test functionality of the pre-boot application. The emulated pre-boot environment is executed within a user mode of an operating system ("OS") during an OS runtime of the processing system. The pre-boot application interacts with a hardware device of the processing system via a kernel proxy agent. The kernel proxy agent executes in a kernel mode of the OS.

20 Claims, 4 Drawing Sheets

FIRMWARE EMULATION ENVIRONMENT FOR DEVELOPING, DEBUGGING, AND TESTING FIRMWARE COMPONENTS INCLUDING OPTION ROMS

TECHNICAL FIELD

This disclosure relates generally to firmware testing, and in particular, relates to development, debugging, and testing of pre-boot applications in an emulated pre-boot environment.

BACKGROUND INFORMATION

Today's hardware developer has a limited suite of tools for developing, debugging, and testing firmware code or pre-boot applications (e.g., hardware drivers). In contrast, an operating system ("OS") application developer has a wide range of powerful development tools at his or her disposal, which enable recursive compiling and source level debugging within the OS environment. Examples of such tool suites include Microsoft's Visual C and Visual .NET.

In a typical personal computer ("PC") architecture, the pre-boot runtime is an initialization and configuration phase of the PC that occurs prior to the OS runtime phase. Firmware code is responsible for initializing the PC up to a point that the OS loaded off of media, such as a hard disk, can take over. The firmware code can include applications stored in a boot firmware device mounted on a motherboard, option read only memories ("ROMs") of add-in cards, and the like. Since a large portion of firmware code only runs during the pre-boot runtime, debugging and testing this firmware code can be awkward and cumbersome. Often, debugging and testing can require repeated booting of the PC to find and remedy a single coding error. Rebooting may be necessary to reinitialize the firmware environment, reinitialize the firmware code under test, and/or reinitialize the hardware device under test after a runtime error.

One tool available to the hardware developer is an in circuit emulator ("ICE"), such as those available from American Arium Corporation of Tustin, Calif. An ICE is a physical device that is coupled between a central processing unit ("CPU") and the CPU socket, and enables the hardware developer to monitor pin traffic on the CPU. The hardware developer can insert halt instructions into the firmware code under test to freeze the CPU operation at significant processing points and analyze the logic states of the CPU pins.

However, an ICE is physically intrusive into the PC. The ICE does not eliminate the need to constantly reboot the PC to generate the pre-boot environment necessary to execute and test a pre-boot application or firmware code. Furthermore, due to the lack of an OS environment to support powerful development tools, hardware developers are often relegated to coding the firmware code in assembly language. Coding in assembly language limits the hardware developer's access to powerful source level tool suites.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of a system and method to provide a pre-boot emulation environment for developing, testing, and/or debugging firmware code are described herein. In the following description numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. An "option read only memory ("ROM")" is defined herein as a nonvolatile memory device for storing firmware for a hardware device, including both read only memories and rewritable memories, such as flash memory.

Figure 1:
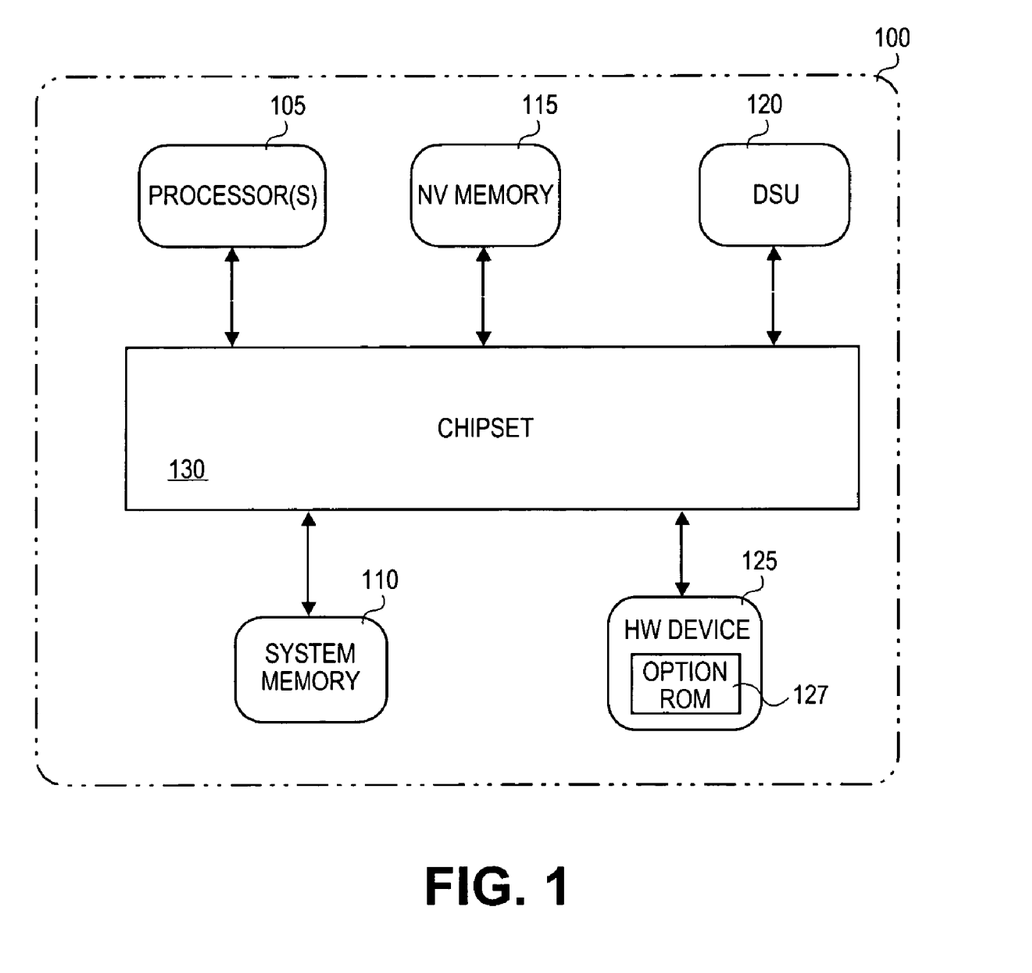
FIG. 1 is a block diagram illustrating a processing system for executing an emulated pre-boot environment to develop, debug, and/or test firmware code, in accordance with an embodiment of the present invention.

FIG. 1 is a block diagram illustrating a processing system 100 to provide a pre-boot emulation environment for developing, testing, and/or debugging firmware code (or pre-boot applications) during an operating system ("OS") runtime, in accordance with an embodiment of the present invention. The illustrated embodiment of processing system 100 includes one or more processors (or central processing units) 105, system memory 110, nonvolatile ("NV") memory 115, a data storage unit ("DSU") 120, a hardware device 125 having an option ROM 127, and a chipset 130.

The elements of processing system 100 are interconnected as follows. Processor(s) 105 is communicatively coupled to system memory 110, NV memory 115, DSU 120, and hardware device 125, via chipset 130 to send and to receive instructions or data thereto/therefrom. In one embodiment, NV memory 115 is a flash memory device. In other embodiments, NV memory 115 includes any one of read only memory ("ROM"), programmable ROM, erasable programmable ROM, electrically erasable programmable ROM, or the like. In one embodiment, system memory 110 includes random access memory ("RAM"). DSU 120 may optionally include one or more of an integrated drive electronic ("IDE") hard disk, an enhanced IDE ("EIDE") hard disk, a redundant array of independent disks ("RAID"), a small computer system interface ("SCSI") hard disk, and the like. Although DSU 120 is illustrated as internal to processing system 100, DSU 120 may be externally coupled to processing system 100.

It should be appreciated that various other elements of processing system 100 have been excluded from FIG. 1 and this discussion for the purposes of clarity. For example, processing system 100 may further include a graphics card, additional DSUs, other persistent data storage devices (e.g., tape drive), a network interface card, and the like. Chipset 130 may also include a system bus and various other data buses for interconnecting subcomponents, such as a memory controller hub and an input/output ("I/O") controller hub, as well as data buses (e.g., peripheral component interconnect ("PCI") bus) for connecting peripheral devices to chipset 130.

Figures 2A, 2B:
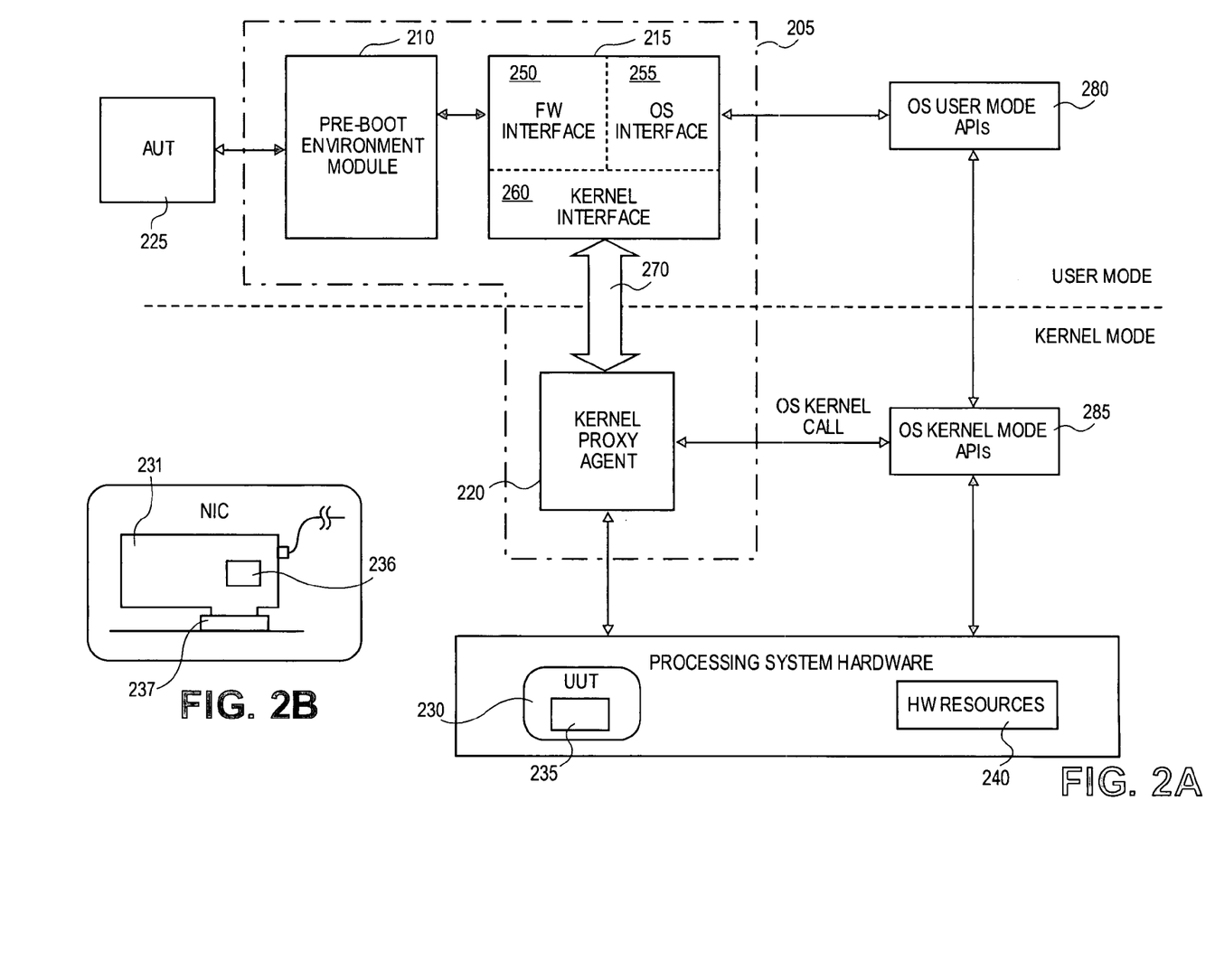
FIG. 2A is a block diagram illustrating data flow between modules of a firmware emulation suite, in accordance with an embodiment of the present invention.
FIG. 2B is a diagram illustrating an example hardware device under test having an option read only memory ("ROM"), in accordance with an embodiment of the present invention.

FIG. 2A is a block diagram illustrating data flow between modules of a firmware emulation suite 205, in accordance with an embodiment of the present invention. The illustrated embodiment of firmware emulation suite 205 includes a pre-boot environment module 210, an interface translator 215, and a kernel proxy agent 220. The components of firmware emulation suite 205 act together to provide an emulated pre-boot environment during an OS runtime of processing system 100. The emulated pre-boot environment enables pre-boot applications (e.g., firmware code) to execute during the OS runtime to develop, debug, and/or test the pre-boot applications.

In one embodiment, pre-boot environment module 210 simulates the pre-boot environment of processing system 100 prior to the OS taking control of processing system 100. In one embodiment, pre-boot environment module 210 provides an Extensible Firmware Interface ("EFI") environment to enable development and testing of EFI-based drivers/applications. EFI is a public industry specification that describes an abstract programmatic interface between platform firmware and shrink-wrap operating systems or other custom application environments. The EFI framework standard includes provisions for extending basic input output system ("BIOS") code functionality beyond that provided by the BIOS code stored in a platform's boot firmware device (e.g., NV memory 115). More particularly, EFI enables firmware, in the form of firmware modules and drivers, to be loaded from a variety of different resources, including primary and secondary flash devices (e.g., option ROM 127), ROMs, various persistent storage devices (e.g., hard disks, CD ROMs, etc.), and even over computer networks. The EFI Specification, Version 1.10, Dec. 1, 2002 and related material may be found at http://developer.intel.com/technology/efi.

As can been seen from FIG. 2A, a portion of firmware emulation suite 205 (i.e., pre-boot environment module 210 and interface translator 215) executes within a user mode of processor 105, while another portion (i.e., kernel proxy agent 220) executes within a kernel mode of processor 105. Typical processors support at least two operating modes. In one embodiment of the present invention, user application code runs in the user mode, whereas operating system code, such as system services and device drivers (e.g., the OS kernel, kernel drivers, etc.) run in the kernel mode. In one embodiment, the kernel mode refers to a mode of execution of processor 105 that grants access to all system memory and all instructions of processor 105. Providing the OS kernel with a higher privilege level than application software executing in the user mode, helps the OS to prevent misbehaving applications from disrupting the stability of processing system 100 as a whole.

For example, Intel x86 processors define four privilege levels to protect the OS including the OS kernel and kernel drivers. These privilege levels are called rings, which range from ring 0 to ring 3. Windows™ 2000 uses only two of these four privilege levels, granting applications/drivers executing in the kernel mode ring 0 privileges and user applications executing in the user mode ring 3 privileges. Ring 0 grants access to all system resources, while ring 3 grants limited access to guard against inadvertent or malicious writes.

Many pre-boot applications are hardware drivers, which interact with hardware entities of processing system 100 (e.g., hardware device 125) during the pre-boot runtime to initialize and to configure the hardware entities. Often, the operations executed by pre-boot applications to configure and initialize or otherwise interact with hardware entities are operations that require kernel mode privileges. Thus, in order to effectively test and/or debug a pre-boot application within the emulated pre-boot environment executing within the user mode of the OS, access to hardware that requires kernel mode privileges may often be necessary.

Some hardware related operations are accessible from the user space via OS user mode application programming interfaces ("APIs") 280. For example, user mode applications can read/write to system memory 110, print to a parallel port, receive input from a keyboard, or read a system time clock. However, user mode applications generally cannot update the system time clock or execute direct PCI accesses. Thus, in one embodiment of the present invention, kernel proxy agent 220 publishes an interface 270 to interface translator 215 to enable pre-boot applications being tested and/or debugged within the emulated pre-boot environment established by pre-boot environment module 210 to execute hardware interactions requiring kernel mode privileges. Providing this level of access enables robust debugging, testing, and verification of a pre-boot application from the user mode of the OS. Furthermore, the user mode of the OS enables deployment of powerful development tool suites for use by hardware developers.

An example pre-boot application is illustrated in FIG. 2A as application under test ("AUT") 225. AUT 225 is a pre-boot application (e.g., EFI driver, etc.) currently being tested or under development. In one embodiment, a unit under test ("UUT") 230 having an option ROM 235 corresponds to hardware device 125 of processing system 100 in a development stage. In one embodiment, option ROM 235 is intended to receive AUT 225 once testing and/or development of AUT 225 is complete. Thus, in one embodiment, option ROM 235 is blank during the execution of AUT 225 within the emulated pre-boot environment established by pre-boot environment module 210. FIG. 2A further illustrates hardware resources 240. Hardware resources 240 may include any hardware device of processing system 100, including for example, system memory 110, a PCI slot, and the like. In one embodiment, hardware resources 240 include hardware resources of processing system 100 which UUT 230 consumes during operation and testing.

FIG. 2B is a diagram illustrating an example of hardware device 125, in accordance with an embodiment of the present invention. FIG. 2B illustrates a network interface card ("NIC") 231 having an option ROM 236. Option ROM 236 may contain one or more pre-boot applications for initializing and configuring NIC 231 during a pre-boot runtime of processing system 100 or it may be entirely blank. NIC 231 consumes hardware resources 240 of processing system 100 when coupled to processing system 100. One example hardware resource is a PCI slot 237. In order for NIC 231 to communicate with processing system 100 without conflict, a communication port, such as PCI slot 237, must be reserved for use by NIC 231. During testing and/or development of the pre-boot applications to be stored into option ROM 236, such as AUT 225, option ROM 236 may be empty. Therefore, pre-boot applications may not be present within option ROM 236 during testing and development to reserve PCI slot 237 for use by NIC 231. Thus, in one embodiment of the present invention, kernel proxy agent 220 reserves PCI slot 237, such that AUT 225 executing within the emulated pre-boot environment established by pre-boot environment module 210 can communicate with NIC 231 (which corresponds to one embodiment of UUT 230).

Firmware emulation suite 205 includes kernel proxy agent 220, which executes within the kernel mode of processor 105, and therefore, has all the rights and privileges attendant with kernel mode operation. Kernel proxy agent 220 publishes interface 270 into the user mode for use by interface translator 215. Interface 270 enables interface translator 215 to communicate with kernel proxy agent 220 and request kernel proxy agent 220 to execute certain specified tasks or to pass the requests on to OS kernel mode APIs 285 via an OS kernel call. OS kernel mode APIs 285 include APIs published by the OS kernel that are linked to kernel mode subroutines to execute specific tasks.

Firmware emulation suite 205 includes pre-boot environment module 210 and interface translator 215 that are executed in the user mode of processor 105. In the illustrated embodiment, interface translator 215 includes three interfaces—firmware interface 250, OS interface 255, and kernel interface 260. Firmware interface 250 provides a firmware interface for AUT 225 to interact with the rest of processing system 100. In one embodiment, AUT 225 executes within the emulated pre-boot environment and interacts with processing system 100, but is entirely unaware that it is executing during the OS runtime of processing system 100 within the user mode, rather than the pre-boot runtime. OS interface 225 provides an interface between OS user mode APIs 280 and the emulated pre-boot environment in which AUT 225 is executing. Kernel interface 260 provides an interface between kernel proxy agent 220 and AUT 225 via interface 270. Thus, interface translator 215 translates requests made within the emulated pre-boot environment by AUT 225 to one of OS user mode APIs 280 executing in the user mode and kernel proxy agent 220 executing in the kernel mode, as is appropriate.

Figure 3:
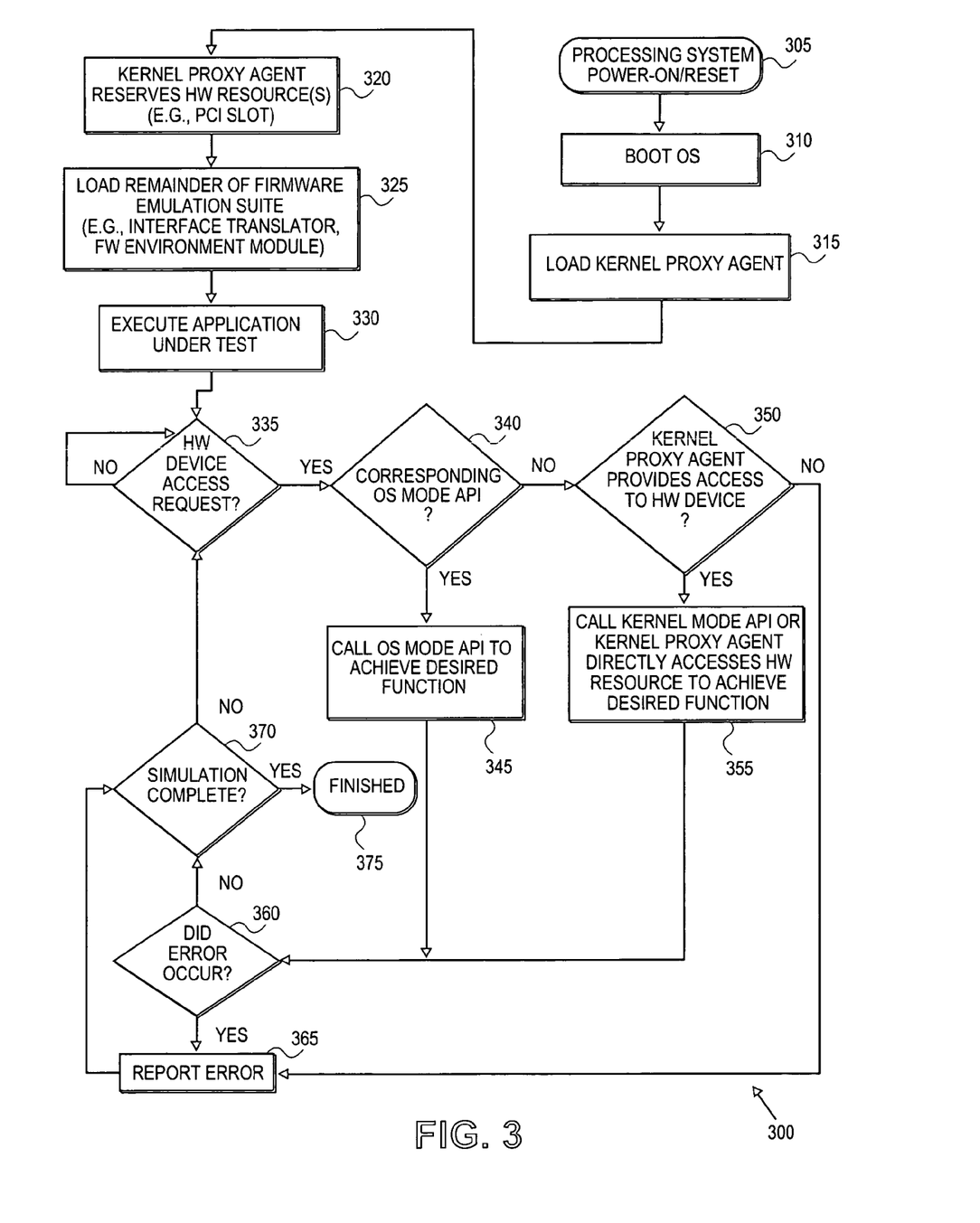
FIG. 3 is a flow chart illustrating a process to emulate a pre-boot environment during an operating system ("OS") runtime, in accordance with an embodiment of the present invention.

FIG. 3 is a flow chart illustrating a process 300 to develop, debug, and/or test AUT 225 within the emulated pre-boot environment during the OS runtime of processing system 100, in accordance with an embodiment of the present invention. In a process block 305, processing system 100 is power cycled. Power cycling processing system 100 includes a reset event or a power on event.

In a processing block 310, processing system 100 begins booting the OS. In one embodiment, the OS is stored on DSU 120 and transferred into system memory 110 via an OS loader. In a process block 315, processor 105 loads kernel proxy agent 220 into system memory 110. In one embodiment, loading kernel proxy agent 220 into system memory 110, includes installing kernel proxy agent 220 into the kernel mode. In one embodiment, kernel proxy agent 220 is installed and loaded under the control of the OS during the OS initialization. After being installed into the kernel mode, kernel proxy agent 220 begins to publish interface 270 into the user mode for access by interface translator 215.

In a process block 320, kernel proxy agent 220 reserves a portion of hardware resources 240 for use by UUT 230. In one embodiment, kernel proxy agent 220 may have been configured to reserve the portion of hardware resources 240 during a previous boot of processing system 100, prior to UUT 230 being coupled into processing system 100. In one embodiment, kernel proxy agent 220 is configured to automatically detect UUT 230 and to reserve the portion of hardware resources 240 necessary to run UUT 230. For example, as illustrated in FIG. 2B, kernel proxy agent 220 may be configured to reserve PCI slot 237 for NIC 231.

In a process block 325, the remainder of firmware emulation suite 205 (i.e., pre-boot environment module 210 and interface translator 215) is loaded into system memory 110 and executed within the user mode. In one embodiment, pre-boot environment module 210 and interface translator 215 are stored on DSU 120 and loaded into system memory 110 for execution therefrom in response to a user of processing system 100 (e.g., hardware developer). Executing pre-boot environment module 210 establishes the emulated pre-boot environment. Executing interface translator 215 enables pre-boot applications executed within the emulated pre-boot environment to interact with hardware and software outside of the emulated pre-boot environment.

In a process block 330, AUT 225 is loaded into the emulated pre-boot environment and executed therefrom. Within this environment, AUT 225 can be executed and re-executed as often as desired or necessary to test and debug AUT 225. Reexecuting AUT 225 does not require rebooting processing system 100, since the emulated pre-boot environment is sustained within the user mode during OS runtime.

Upon being executed, AUT 225 may attempt to access a hardware device of processing system 100. In decision block 335, if AUT 225 attempts to access a hardware device of processing system 100, process 300 continues to decision block 340. In decision block 340, if the interaction requested has a corresponding OS user mode API 280 to execute the desired task, then process 300 continues to a process block 345. In process block 345, interface translator 215 calls the corresponding OS user mode API 280 to achieve the desired function. In so doing, interface translator 215 may pass on data or operands or a simple request to the corresponding OS user mode API 280 via OS interface 255.

Returning to decision block 340, if a corresponding OS user mode API 280 to execute the desired interaction is not provided by the OS, then process 300 continues to a decision block 350. In decision block 350, if kernel proxy agent 220 provides access to the requested hardware device, process 300 continues to a process block 355. In process block 355, interface interpreter 215 forwards the interaction request to kernel proxy agent 220 via kernel interface 260 and interface 270. Again, interface interpreter 215 may pass on data or operands or a simple request to the kernel proxy agent 220. In one embodiment, kernel interface 260 makes a system call into the kernel mode to invoke kernel proxy agent 220. In response, kernel proxy agent 220 either calls a corresponding one of OS kernel mode APIs 285 to achieve the desired function or executes the desired interaction with the hardware device (e.g., UUT 230) itself. Thus, in one embodiment, kernel proxy agent 220 includes kernel mode hardware drivers for interacting with hardware devices of processing system 100. In one embodiment, kernel proxy agent 220 includes kernel mode drivers for interacting with UUT 230.

In a decision block 360, it is determined whether an error occurred or whether the requested task/function was executed as expected. In one embodiment, if an error did occur, an error report is generated (process block 365). The error report can simply be output to a monitor for display to the user of processing system 100 and/or it could be saved to a log file for later review. Once the error report is generated, process 300 continues to a decision block 370. In decision block 370, if the simulation of AUT 225 within the emulated pre-boot environment is complete, process 300 continues to a process block 375. If AUT 225 has other requests/tasks to further execute, then the simulation is not complete and process 300 returns to decision block 335 and continues therefrom, as described above.

Returning to decision block 350, if there are no corresponding OS mode APIs 280 (decision block 340) and kernel proxy agent 220 is also unable to execute the requested task/function or call an corresponding OS kernel mode API 285 to execute the requested task/function, then process 300 continues to process block 365 where an error report is generated. Process 300 continues therefrom, as described above.

Figure 4:
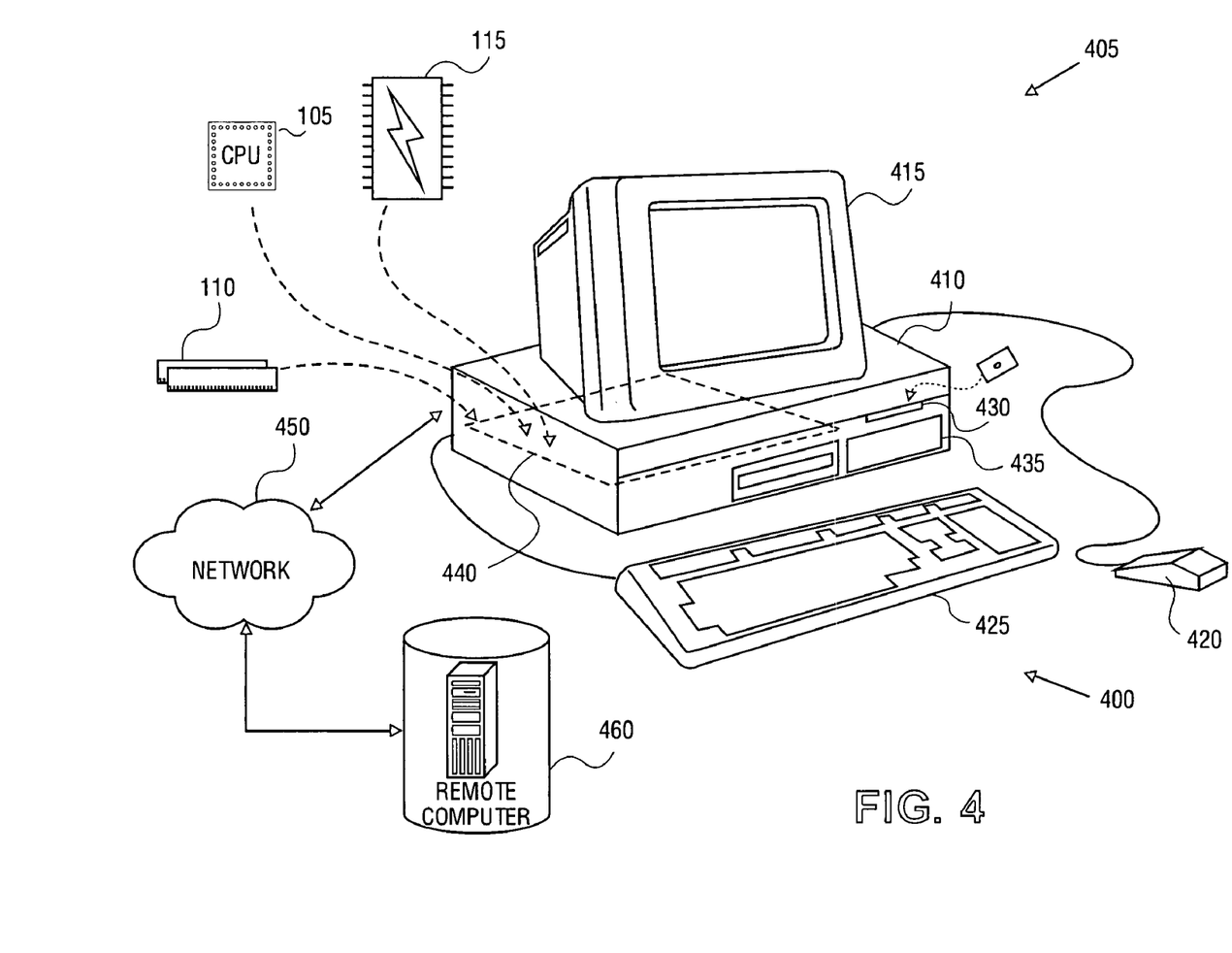
FIG. 4 is a diagram illustrating a demonstrative processing system to emulate a pre-boot environment during an OS runtime to develop, debug, and/or test firmware code, in accordance with an embodiment of the present invention.

FIG. 4 is a diagram of a system 400 including an isometric view of a processing system 405, in accordance with an embodiment of the present invention. Processing system 405 is one possible embodiment of processing system 100. The illustrated embodiment of processing system 405 includes a chassis 410, a monitor 415, a mouse 420 (or other pointing device), and a keyboard 425. The illustrated embodiment of chassis 410 further includes a floppy disk drive 430, a hard disk 435 (e.g., DSU 120), a power supply (not shown), and a motherboard 440 populated with appropriate integrated circuits including system memory 110, NV memory 115, and one or more processors 105.

In one embodiment, a network interface card ("NIC") (not shown) is coupled to an expansion slot (not shown) of motherboard 440. The NIC is for connecting processing system 405 to a network 450, such as a local area network, wide area network, or the Internet. In one embodiment network 450 is further coupled to a remote computer 460, such that processing system 405 and remote computer 460 can communicate.

Hard disk 435 may comprise a single unit, or multiple units, and may optionally reside outside of processing system 405. Monitor 415 is included for displaying graphics and text generated by software and firmware programs run by processing system 405. Mouse 420 (or other pointing device) may be connected to a serial port, USB port, or other like bus port communicatively coupled to processor(s) 105. Keyboard 425 is communicatively coupled to motherboard 440 via a keyboard controller or other manner similar to mouse 420 for user entry of text and commands.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
executing a pre-boot application within an emulated pre-boot environment to test functionality of the pre-boot application, the emulated pre-boot environment executing within a user mode of a processor of a processing system during an operating system ("OS") runtime of the processing system and passing requests for executing a desired task to the OS when the OS comprises a user mode application programming interface for executing the desired task; and
interacting with a hardware device of the processing system in response to the executing of the pre-boot application via a kernel proxy agent executing in a kernel mode of the processor, wherein the kernel proxy agent comprises a software agent executing on the processor to provide access to processing system resources for executing the desired task by enabling interaction between the pre-boot application and the hardware device when the OS does not include the user mode application programming interface for executing the desired task.

2. The method of claim 1, further comprising reporting whether an error occurred during the interacting with the hardware device.

3. The method of claim 1, further comprising executing an interface translator in the user mode of the processor during the OS runtime to pass a request for hardware interaction from the pre-boot application to a corresponding OS user mode application programming interface ("API") if the corresponding OS user mode API is provided by the OS and to pass the request for hardware interaction to the kernel proxy agent if the OS does not provide the corresponding OS user mode API.

4. The method of claim 3 wherein interacting with the hardware device via the kernel proxy agent comprises publishing an interface to the user mode of the processor by the kernel proxy agent, the interface to enable the interface translator to pass the request for hardware interaction to the kernel proxy agent.

5. The method of claim 1, further comprising executing the kernel proxy agent to reserve a hardware resource of the processing system for use by the hardware device.

6. The method of claim 5 wherein the hardware device comprises a peripheral component interconnect ("PCI") add-in card and wherein the hardware resource includes a PCI slot for communicatively coupling the PCI add-in card into the processing system.

7. The method of claim 1 further comprising copying the pre-boot application into an option read only memory ("ROM") of the hardware device after the functionality of the pre-boot application is determined to be correct.

8. The method of claim 7 wherein the pre-boot application comprises a hardware driver of the hardware device.

9. A machine-accessible medium that provides instructions that, if executed by a machine, will cause the machine to perform operations comprising:
executing an emulated pre-boot environment to test functionality of a pre-boot application, the emulated pre-boot environment executing within a user mode of a processor of a processing system during an operating system ("OS") runtime of the processing system and passing requests for executing a desired task to the OS when the OS comprises a user mode application programming interface for executing the desired task; and interacting with a hardware device of the processing system via a kernel proxy agent executing in a kernel mode of the processor in response to a request for hardware interaction from the pre-boot application, wherein the kernel proxy agent comprises a software agent executing on the processor to provide access to processing system resources for executing the desired task by enabling interaction between the pre-boot application and the hardware device when the OS does not include the user mode application programming interface for executing the desired task.

10. The machine-accessible medium of claim 9, further providing instructions that, if executed by the machine, will cause the machine to perform further operations, comprising:

reporting whether an error occurred during the interacting with the hardware device.

11. The machine-accessible medium of claim 9, further providing instructions that, if executed by the machine, will cause the machine to perform further operations, comprising:

executing an interface translator in the user mode of the processor during the OS runtime to pass the request for hardware interaction from the pre-boot application to a corresponding OS user mode application programming interface ("API") if the corresponding OS user mode API is provided by the OS and to pass the request for hardware interaction to the kernel proxy agent if the OS does not provide the corresponding OS user mode API.

12. The machine-accessible medium of claim 11, further providing instructions that, if executed by the machine, will cause the machine to perform the operations wherein interacting with the hardware device via the kernel proxy agent comprises publishing an interface to the user mode of the processor by the kernel proxy agent, the interface to enable the interface translator to pass the request for hardware interaction to the kernel proxy agent.

13. The machine-accessible medium of claim 9, further providing instructions that, if executed by the machine, will cause the machine to perform further operations, comprising:

executing the kernel proxy agent to reserve a hardware resource of the processing system for use by the hardware device.

14. The machine-accessible medium of claim 13 wherein the hardware device comprises a peripheral component interconnect ("PCI") add-in card and wherein the hardware resource includes a PCI slot for communicatively coupling the PCI add-in card into the processing system.

15. The machine-accessible medium of claim 9, further providing instructions that, if executed by the machine, will cause the machine to perform further operations, comprising:

installing the kernel proxy agent into the kernel mode during an initialization phase of the OS.

16. A processing system, comprising:

a processor to execute an operating system ("OS") and to execute a pre-boot application, the processor having a user mode and a kernel mode;

a hardware device communicatively coupled to the processor; and a data storage unit communicatively coupled to the processor and having stored thereon a pre-boot environment module and a kernel proxy agent, the pre-boot environment module to be executed by the processor to generate an emulated pre-boot environment within the user mode for executing the pre-boot application and for passing requests for executing a desired task to the OS when the OS comprises a user mode application programming interface for executing the desired task, the kernel proxy agent to be executed by the processor to provide access to system resources to execute the desired task by enabling interaction between the pre-boot application and the hardware device when the OS does not include the user mode application programming interface ("API") for executing the desired task for interacting with the hardware device, wherein the kernel proxy agent comprises a software agent executing on the processor.

17. The processing system of claim 16 wherein the kernel proxy agent includes instructions to reserve a hardware resource of the processing system for use by the hardware device.

18. The processing system of claim 17 wherein the hardware device comprises a peripheral component interconnect ("PCI") add-in card and wherein the hardware resource includes a PCI slot for communicatively coupling the PCI add-in card to the processor.

19. The processing system of claim 16, further comprising the data storage unit having stored thereon an interface translator to be executed by the processor, the interface translator executable in the user mode to pass a request for hardware interaction from the pre-boot application to a corresponding OS user mode API if the corresponding OS user mode API is provided by the OS and to pass the request to the kernel proxy agent if the OS does not provide the corresponding OS user mode API.

20. The processing system of claim 19 wherein the kernel proxy agent is further to be executed by the processor to generate an error report if the request for hardware interaction passed to the kernel proxy agent results in an error.

* * * * *

UNITED STATES PATENT AND TRADEMARK OFFICE
CERTIFICATE OF CORRECTION

PATENT NO. : 7,334,120 B2 Page 1 of 1
APPLICATION NO. : 10/713720
DATED : February 19, 2008
INVENTOR(S) : Rothman et al.

It is certified that error appears in the above-identified patent and that said Letters Patent is hereby corrected as shown below:

In column 9, at line 4, after "system", insert --in response to a request for hardware interaction from the pre-boot application, this interacting--.

In column 9, at line 5, delete "in response to a request for hardware interaction from the pre-boot application".

Signed and Sealed this

Twenty-sixth Day of August, 2008

JON W. DUDAS
*Director of the United States Patent and Trademark Office*